United States Patent
Biemer

(10) Patent No.: US 10,089,694 B1
(45) Date of Patent: Oct. 2, 2018

(54) DEDUCTIBLE DETERMINATION SYSTEM

(71) Applicant: Allstate Insurance Company, Northbrook, IL (US)

(72) Inventor: Edward A. Biemer, Glencoe, IL (US)

(73) Assignee: Allstate Insurance Company, Northbrook, IL (US)

( * ) Notice: Subject to any disclaimer, the term of this patent is extended or adjusted under 35 U.S.C. 154(b) by 606 days.

(21) Appl. No.: 14/715,751

(22) Filed: May 19, 2015

(51) Int. Cl.
  *G06Q 40/00* (2012.01)
  *G06Q 40/08* (2012.01)

(52) U.S. Cl.
  CPC .................................. *G06Q 40/08* (2013.01)

(58) Field of Classification Search
  CPC ..................................... G06Q 40/08
  USPC ............................................. 705/4
  See application file for complete search history.

(56) References Cited

U.S. PATENT DOCUMENTS

| | | | |
|---|---|---|---|
| 5,797,134 A * | 8/1998 | McMillan | G06Q 30/0283 705/4 |
| 8,044,809 B2 | 10/2011 | Farmer | |
| 8,090,598 B2 | 1/2012 | Bauer et al. | |
| 8,176,145 B1 | 5/2012 | Stender et al. | |
| 8,620,693 B1 | 12/2013 | Schumann, Jr. | |
| 8,731,768 B2 | 5/2014 | Fernandes et al. | |
| 8,768,734 B2 | 7/2014 | Gryan et al. | |
| 8,799,034 B1 | 8/2014 | Brandmaier et al. | |
| 2002/0111725 A1* | 8/2002 | Burge | G06Q 40/08 701/31.4 |
| 2007/0005404 A1 | 1/2007 | Raz et al. | |
| 2009/0210257 A1 | 8/2009 | Chalfant et al. | |
| 2010/0030586 A1 | 2/2010 | Taylor et al. | |
| 2011/0077028 A1* | 3/2011 | Wilkes, III | B60W 50/14 455/456.3 |
| 2011/0213628 A1 | 9/2011 | Peak et al. | |
| 2011/0294520 A1 | 12/2011 | Zhou et al. | |

(Continued)

FOREIGN PATENT DOCUMENTS

WO   WO-2015118325 A1 *   8/2015   ............. G06Q 40/08

OTHER PUBLICATIONS

Johnson et al: "Driving Style Recognition Using a Smartphone as a Sensor Platform", 2011 14th International IEEE Conference on Intelligent Transportation Systems Washington, DC, USA. Oct. 5-7, 2011 (Year: 2011).*

(Continued)

*Primary Examiner* — Edward J Baird
(74) *Attorney, Agent, or Firm* — Banner & Witcoff, Ltd.

(57) ABSTRACT

Methods, computer-readable media, software, and apparatuses provide a system for adjusting a deductible based on a current driving situation. Information regarding the current driving situation related to a vehicle may be obtained from various sources. The information may be used to evaluate a degree of safety of the current driving situation. If the driving situation is deemed to be safe, the deductible may be lowered. The amount the deductible may be lowered may be determined based on insurance information regarding past accidents or past insurance claims. A notification of the adjustment may be output to the driver. Also, the adjustment may be stored with a time associated with the adjustment so that the appropriate deductible is used in case of an accident. Multiple adjustments to the deductible may be made during a single trip as the driving situation changes.

18 Claims, 6 Drawing Sheets

(56) References Cited

U.S. PATENT DOCUMENTS

| | | | |
|---|---|---|---|
| 2012/0109692 A1 | 5/2012 | Collins et al. | |
| 2013/0179198 A1 | 7/2013 | Bowne et al. | |
| 2013/0204645 A1 | 8/2013 | Lehman et al. | |
| 2014/0149145 A1 | 5/2014 | Peng et al. | |
| 2014/0191858 A1 | 7/2014 | Morgan et al. | |
| 2014/0222469 A1 | 8/2014 | Stahl et al. | |
| 2015/0092056 A1* | 4/2015 | Rau | G08G 1/167 348/148 |
| 2016/0055764 A1* | 2/2016 | Kujala | B60W 50/14 434/66 |
| 2016/0189304 A1* | 6/2016 | Todasco | G06Q 40/08 705/4 |

OTHER PUBLICATIONS

"Insurance telematics could 'flip the underwriting model on its head'" Truck News, Aug. 14, 2014 http://www.trucknews.com/business-management/insurance-telematics-could-flip-the-underwriting-model-on-its-head/1001631122/.

"Insurance Telematics: Why Usage-based Underwriting Will Catch Fire" Aug. 19, 2014 http://blogs.strategyanalytics.com/AMCS/default.aspx?tag=/Telematics&page=2.

"DC Protect: The Power to Protect" Lytx, Aug. 19, 2014 http://www.lytx.com/our-solutions/dc-protect.

"Cutting Costs on Teenager Car Insurance" Geico, Aug. 19, 2014 https://www.geico.com/information/safety/auto/teendriving/parent-cutting-costs/.

"Usage-Based Insurance and Telematics" National Association of Insurance Commisioners & The Center for Insurance Policy and Research, Aug. 14, 2014 http://www.naic.org/cipr_topics/topic_usage_based_insurance.htm.

"Auto Insurance Questions" Farmers Insurance, Aug. 19, 2014 http://www.farmers.com/faq/auto/#deductible.

"How future apps will target and market your brainwaves" Stratrisks Observing the Grand Geopolitical Game of Risk, Aug. 19, 2015 http://stratrisks.com/geostrat/11519.

"Deductibles, Coverages, and Car Insurance Rates" DMV. ORG, Aug. 19, 2014, http://www.dmv.org/insurance/how-assuming-more-risk-lowers-auto-insurance-rates.php.

* cited by examiner

DEDUCTIBLE DETERMINATION SYSTEM

FIELD OF ART

Aspects of the disclosure generally relate to methods and computer systems, including one or more computers particularly configured and/or executing computer software. More particularly, aspects of this disclosure relate to a system for determining an insurance deductible and adjusting the deductible based on a current driving situation.

BACKGROUND

Insurance policies, such as automotive insurance policies, typically specify, among other things, a premium and a deductible. The premium is an amount of money a policy holder pays on a regular basis (e.g., monthly) to maintain the insurance policy. The deductible is the amount of money a policy holder is responsible for paying for any given claim before an insurance company takes responsibility to cover the remaining amount of the claim. Premiums and deductibles may be different for different policy holders and different insurance companies may offer the same person different premiums and deductibles. Premiums and deductibles may be determined by a variety of factors, including demographic information and geographic information. Premiums and deductibles may also be based on a policy holder's past claims. For example, a policy holder who has submitted numerous insurance claims may have a higher premium and/or deductible than a policy holder who has not made any insurance claims.

In some cases, a premium and deductible for a specific policy holder may change over time. For example, the premium and deductible for a specific policy holder may rise because of inflation or a cost in automotive repairs. In contrast, the premium and deductible for a specific policy holder may fall because the policy holder has maintained a safe driving record over some period of time (e.g., has not been involved in an accident for five years). Knowing that their driving record may affect their premiums and deductibles, some policy holders may alter their driving behavior to avoid automotive accidents. However, some policy holders doubt that changing their driving behavior will reduce the likelihood of being in an automotive accident and some policy holders doubt that they will ever receive a decrease in their insurance premium and/or deductible even if they are not involved in an accident. Thus, promises to reduce premiums and deductibles of those who avoid accidents will not persuade some policy holders to improve their driving behavior.

Generally, insurance companies, like most companies, are interested in keeping costs down. For automotive insurance companies, costs may be incurred when customers are involved in accidents. Therefore, automotive insurance companies may be interested in reducing the likelihood of automotive accidents. As such, an automotive insurance company may be interested in incentivizing its customers (e.g., policy holders) to drive safely.

Accordingly, new systems, devices, methodologies, and software are desired to adjust insurance deductibles on-the-fly while policy holders are driving to incentivize them to drive safely.

BRIEF SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the disclosure address one or more of the issues mentioned above by disclosing methods, computer readable storage media, software, systems, and apparatuses for providing a deductible determination system that may determine and/or adjust a deductible of an insurance policy while a policy holder is driving. The system allows an insurance deductible to be modified or adjusted on the fly in accordance with a current driving situation. The deductible may be based on various factors, such as current external conditions, current internal conditions, a current condition of the driver, a current condition of the vehicle. The system also provides the adjusted deductible to the driver while she is driving so as to incentive her to drive safely or take other measures to avoid an accident. The value provided to the driver may correspond to an amount of the adjustment (e.g., an amount of an increase or decrease) or the newly determined deductible (e.g., the full deductible that is in effect).

Aspects of this disclosure provide a system comprising an end user computing device (e.g., a mobile computing device, such as a cell phone, tablet, personal digital assistant, etc. or vehicle computing device, such as a device installed in a vehicle dashboard) associated with a vehicle and a network computing device (e.g., a server). The end user device may include a wireless network interface configured to communicate over a wireless network. Meanwhile, the network computing device may include a network interface configured to exchange communications with the end user computing device. The network computing device may be configured to obtain, from the end user computing device or another network computing device (e.g., a third party server), driving situation information indicating a driving situation related to the vehicle while the vehicle is moving (e.g., a current driving situation at a point in time during a trip). For example, the driving situation information may include weather information regarding weather at a location of the vehicle, traffic information regarding traffic at the location of the vehicle, road information regarding a condition or level of safety of a road on which the vehicle travels, vehicle status information regarding a condition of the vehicle, vehicle condition information regarding a condition inside or in proximity to the vehicle, driving behavior information regarding a speed, acceleration, or deceleration of the vehicle, driver status information regarding a condition of a driver of the vehicle, or driver choice information regarding whether the driver of the vehicle chose to block a text message or phone call.

The network computing device may also be configured to determine a degree of safety of the driving situation based on at least a portion of the driving situation information. Determining the degree of safety of the driving situation may include determining a safety score. In some embodiments, determining the degree of safety of the driving situation based on at least the portion of the driving situation information may include determining a value based on at least the portion of the driving situation information and determining a safety score by computing an algorithm using the value. Also, the network computing device may be further configured to select the algorithm from a plurality of algorithms, and determine a weight to be assigned to the value.

The network computing device may be further configured to obtain a deductible of an insurance policy for the vehicle and adjust the deductible based on the degree of safety of the driving situation. Adjusting the deductible based on the degree of safety of the driving situation may include using data regarding past accidents or past insurance claims. In some embodiments, adjusting the deductible using the data regarding past accidents or past insurance claims may include decreasing the deductible when a number of past accidents on a route along which the vehicle is moving is below a first threshold or increasing the deductible when the number of past accidents on the route is above a second threshold. The first and second thresholds may be the same or different.

Further, adjusting the deductible based on the degree of safety of the driving situation may include decreasing the deductible in response to an increase in the degree of safety of the driving situation or increasing the deductible in response to a decrease in the degree of safety of the driving situation.

Aspects of the disclosure also provide the computing devices of the system as well as the computer readable media of those computing devices that store deductible determination programs. Specifically, aspects of the disclosure provide a computing device, including a network interface configured to communicate with a server or an end user computing device while the end user computing device is traveling within a vehicle. The computing device may also include at least one processor. The at least one processor may be configured to execute computer-executable instructions (e.g., a deductible determination program) stored on computer readable media (including non-transitory computer readable media). The at least one processor may also be configured to cause (or control) the computing device to obtain, from the end user computing device or the server, driving situation information indicating a driving situation related to the vehicle while the vehicle is on a trip; determine a degree of safety of the driving situation based on at least a portion of the driving situation information; obtain a deductible of an insurance policy for the vehicle; and determine an amount by which to adjust the deductible based on the degree of safety of the driving situation. The at least one processor may be configured to further cause the computing device to store the adjusted deductible in memory. Also, the at least one processor may be configured to further cause the computing device to store, in memory, a time at which the amount is determined. Moreover, the at least one processor may be configured to further cause the computing device to transmit, to the end user computing device, a notification indicating the amount by which the deductible is adjusted.

Aspects of the disclosure further provide a method of determining an adjustment to a deductible. The method may include receiving, by a computing device (e.g., a mobile phone) from a sensor (e.g., light sensor, tire pressure sensor, weather balloon sensor, etc.) in proximity to a vehicle, driving situation information indicating a driving situation related to the vehicle while the vehicle is traveling along a route; determining a degree of safety of the driving situation based at least on the driving situation information; obtaining a deductible of an insurance policy for the vehicle; and determining an adjustment to the deductible based on the degree of safety of the driving situation. Determining the adjustment to the deductible based on the degree of safety of the driving situation may include determining the degree of safety of driving on the route based on past accident information or past insurance claim information. The method may also include outputting, via a display of the computing device or a speaker of the computing device, a notification to a driver of the vehicle, the notification indicating the adjustment to the deductible. Further, the method may include transmitting, by the computing device to an insurance company's server, the adjustment to the deductible and a time at which the adjustment to the deductible was determined.

Of course, the methods and systems of the above-referenced embodiments may also include other additional elements, steps, computer-executable instructions, or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF THE DRAWINGS

The present invention is illustrated by way of example and is not limited by the accompanying figures in which like reference numerals indicate similar elements and in which.

DETAILED DESCRIPTION

Figure 1:
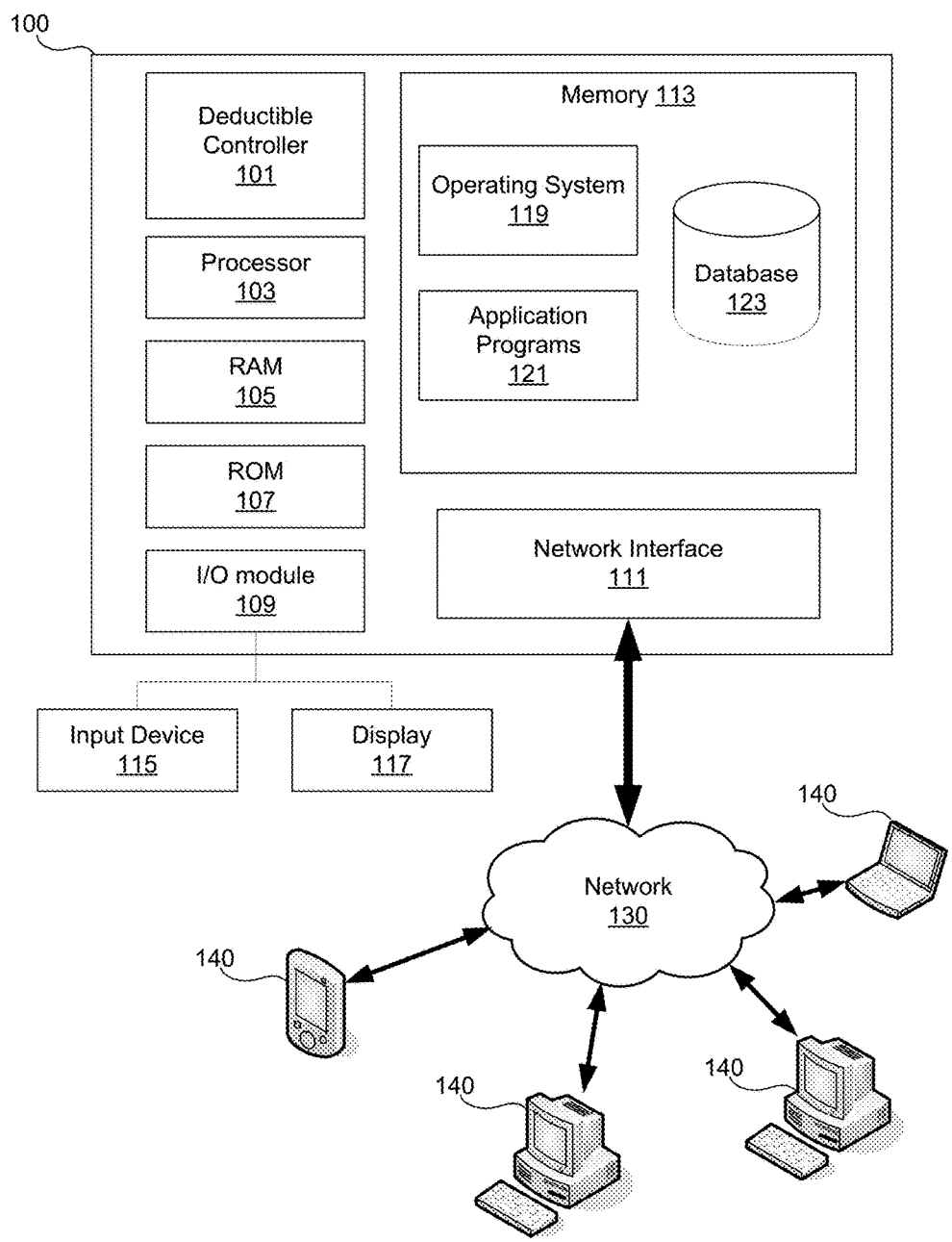
FIG. 1 is a block diagram of an example computing device that may be used according to an illustrative embodiment of the present disclosure.

In accordance with various aspects of the disclosure, methods, computer-readable media, software, and apparatuses are disclosed that provide a deductible determination system for determining deductibles based on current driving conditions. The deductible determination system may incentivize policy holders to exhibit good driving behavior. Additionally, or alternatively, the deductible determination system may incentivize policy holders to take other measures (e.g., change routes, use a different vehicle, switch drivers, etc.) to avoid accidents or reduce a likelihood of an accident occurring or amount of damage incurred in the event of an accident. The deductible increases or decreases based on the safety of a current driving situation (e.g., a situation in which a user is driving at a time when a user is driving). The deductible can be determined based on factors, such as a driver's safety factors and historic driving score or record, current weather, current traffic, type of road, route selected for a trip, etc. In some examples, calculation of the deductible may also factor in the driver's current condition (e.g., sleepy, intoxicated, sick, etc.) and the driver's choices (e.g., choice to allow text messages to be received during the trip, choice to allow phone calls to be received during the trip, etc.).

In some embodiments, the deductible may be determined at a start of the trip. The proposed deductible may be displayed or otherwise output to a policy holder, driver, etc. prior to the start of a trip. The deductible determination system may also display different options along with an amount of the deductible for the different options. These options can include different routes, driving at a different time, using a different driver (e.g., a spouse or another employee) and other factors.

The deductible determination system may determine an amount of the deductible or an amount by which a base deductible is to be adjusted (either increased or decreased). The determination for a particular trip may be made using, for example, past insurance information (e.g., past accidents and past claim information) associated with a route of the particular trip, a type of driver of the particular trip, and driving conditions during the trip. For example, information that a large number of accidents occurred in the past along the same route currently being taken may be used to determine an increase in the deductible. Or, for example, information that a low number of accidents have occurred on the current route at the time that the current trip is being taken may be used to determine a reduction in the deductible. Accordingly, access to insurance related information in one or more databases of one or more insurance companies may be leveraged by such insurance companies to implement the deductible determination system.

In some examples, deductibles may be determined on-the-fly based on real-time data and/or historical data. For example, one minute a current driving situation may be deemed risky and therefore the deductible may be increased, and the next minute the current driving situation may be deemed safe and therefore the deductible may be decreased. Here, a minute interval is used as an example. Other time periods (greater or less than a minute) may be used to dictate the frequency at which a driving situation is evaluated. The deductible determinations may be made at consistent intervals or varying times (e.g., random times). In some embodiments, for example, the deductible determinations may be triggered by one or more trigger events, such as a weather alert, exceeding a certain speed, braking too hard, etc.

Various algorithms may be used to determine deductible adjustments. Different algorithms may be used in different circumstances. One algorithm may be used for one user whereas another algorithm may be used for another user. Which algorithm to use may depend on the insurance policy of the user or other information about the user, vehicle, or driving conditions.

In some embodiments, an amount of the adjustment of the deductible may be different for different users. For example, premium customers (e.g., policy holders with multiple insurance policies with the same insurance company) may receive greater reductions in their deductibles than other customers. As an example, a first customer having two insurance policies with an insurance company may receive a greater reduction in her deductible than a second customer having only one insurance policy with the insurance company even where the first and second customers are driving in the same or similar driving conditions and have the same or similar driving history. Accordingly, the deductible determination system may encourage some customers to purchase additional insurance policies, including non-automotive insurance, from an insurance company.

In some embodiments, different users may receive different deductible adjustments for the same behavior because of their driving history. For example, in one embodiment, a first user with a bad driving record may receive a small decrease in comparison to a second user with a good driving record even where the first and second users are driving in the same or similar driving conditions. In another embodiment, the first user with the bad driving record may receive a greater decrease in comparison to the second user with the good driving record so as to provide a stronger incentive to the first user with the bad driving record to drive more safely or in safer conditions.

As a result of aspects described herein, automotive insurance deductibles may be adjusted on-the-fly. Consequently, aspects of this disclosure may lead to a reduction in automotive accidents (e.g., traffic accidents), which may lead to a reduction in costs of insurance companies, which in turn may translate into lower rates for customers of insurance companies.

In the following description of the various embodiments of the disclosure, reference is made to the accompanying drawings, which form a part hereof, and in which is shown by way of illustration, various embodiments in which the disclosure may be practiced. It is to be understood that other embodiments may be utilized and structural and functional modifications may be made.

In one or more arrangements, teachings of the present disclosure may be implemented with a computing device. FIG. 1 illustrates a block diagram of an example computing device 100 that may be used according to an illustrative embodiment of the present disclosure. The computing device 100 may be similar to any available computing device, such as a personal computer (e.g., a desktop computer), server, laptop computer, notebook, tablet, smartphone, etc. The computing device 100 may have a deductible controller 101 for performing methods and executing instructions of a deductible determination program, which may be one of a plurality of programs in a suite of programs (including, e.g., a client-side program and server-side program) used by the deductible determination system to perform the functions described. The deduction controller 101 may, e.g., determine an insurance deductible based on a driving situation. The deduction controller 101 may be implemented with one or more processors and one or more storage units (e.g., databases, RAM, ROM, and other computer-readable media), one or more application specific integrated circuits (ASICs), and/or other hardware components. Throughout this disclosure, the deduction controller 101 may refer to the software and/or hardware used to implement the deduction controller 101. The one or more processors of the deduction controller 101 may operate in addition to or in conjunction with another general processor 103 of the computing device 100. Both the deduction controller 101 and the processor 103 may be capable of controlling operations of the computing device 100 and its associated components, including RAM 105, ROM 107, an input/output (I/O) module 109, a network interface 111, and memory 113.

The I/O module 109 may be configured to be connected to an input device 115, such as a microphone, keypad, keyboard, touchscreen, and/or stylus through which a user of the computing device 100 may provide input data. The I/O module 109 may also be configured to be connected to a display device 117, such as a monitor, television, touchscreen, etc., and may include a graphics card. The display device 117 and input device 115 are shown as separate elements from the computing device 100, however, they may be within the same structure. Using the input device 115, system administrators may update various aspects of the deduction determination program, such as rules for determining a current driving situation, rules for adjusting a deductible (including rules for selecting an appropriate algorithm to make such determination), etc. On some computing devices 100, the input device 115 may be operated by users (e.g., customers) to interact with the deductible determination program, including providing user information, user preferences, and other information such as route information for an upcoming trip, vehicle information, driver information, etc. Meanwhile, the display device 117 may assist the system administrators and users to confirm/appreciate their inputs. Also, the determined deductibles may be output to users and system administrators via display devices 117.

The memory 113 may be any computer readable medium for storing computer executable instructions (e.g., software). The instructions stored within memory 113 may enable the computing device 100 to perform various functions. For example, memory 113 may store software used by the computing device 100, such as an operating system 119 and application programs 121, and may include an associated database 123.

The network interface 111 allows the computing device 100 to connect to and communicate with a network 130. The network 130 may be any type of network, including a local area network (LAN) and/or a wide area network (WAN). For example, the network may include one or more of a variety of networks, such as the Internet, a cellular network, satellite network, or public switched telephone network. Through the network 130, the computing device 100 may communicate with one or more other computing devices 140, such as laptops, notebooks, smartphones, personal computers, servers, etc. The computing devices 140 may also be configured in a similar manner as computing device 100. In some embodiments the computing device 100 may be connected to the computing devices 140 to form a "cloud" computing environment.

The network interface 111 may connect to the network 130 via communication lines, such as coaxial cable, fiber optic cable, etc. or wirelessly using a cellular backhaul or a wireless standard, such as IEEE 802.11, IEEE 802.15, IEEE 802.16, etc. In some embodiments, the network interface may include a modem. Further, the network interface 111 may use various protocols, including TCP/IP, Ethernet, File Transfer Protocol (FTP), Hypertext Transfer Protocol (HTTP), etc., to communicate with other computing devices 140. In some embodiments, the computing device may include multiple network interfaces 111 for communicating using different protocols or standards or over different networks.

FIG. 1 is an example embodiment of a computing device 100. In other embodiments, the computing device 100 may include fewer or more elements. For example, the computing device 100 might not include the processor 103 in addition to one or more processors of the deductible controller 101. On the other hand, the computing device 100 may be a mobile device (e.g., a smartphone, tablet, etc.), and thus, may also include various other components, such as a battery, speaker, and/or antennas (not shown). Also, the computing device 100 may be a vehicle computing device 100 (either installed by a vehicle manufacturer or as an aftermarket part) having vehicle compatible elements, such as a port for an on-board diagnostic connector or ports for other vehicle sensors (e.g., tire pressure sensors, engine temperature sensors, etc.).

Figure 2:
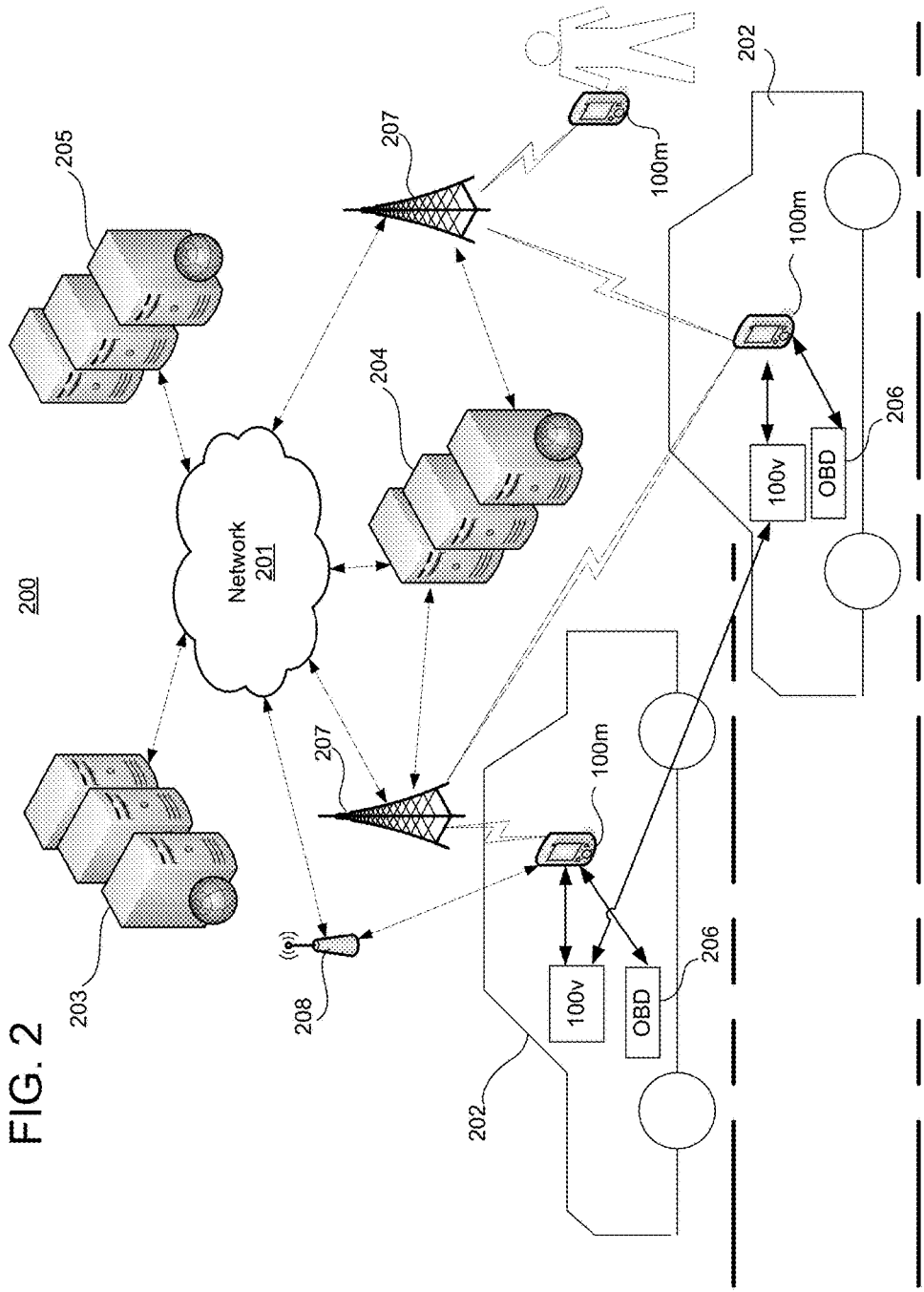
FIG. 2 illustrates an example network environment in which a system in accordance with the present disclosure may be implemented.

The methods and software for determining deductibles based on current driving situations as disclosed herein may be implemented on one or more computing devices 100 used in various network environments. FIG. 2 illustrates an example network environment 200 for implementing methods according to the present disclosure. As shown in FIG. 2, the network environment 200 may include a network 201 configured to connect computing devices (e.g., mobile computing devices 100*m*) within or associated with vehicles 202, one or more third party servers 203, one or more service provider servers 204, and one or more deductible determination servers 205. Collectively, these computing devices may form a deductible determination system. The network 201 may be any type of network, like the network 130 described above, and use one or more communication protocols (e.g., protocols for the Internet (IP), Bluetooth, cellular communications, satellite communications, etc.) to connect computing devices and servers within the network environment 200 so they may send and receive communications between each other. In particular, the network 201 may include a cellular network and its components, such as cell towers. Accordingly, for example, a mobile computing device 100*m* (e.g., a smartphone) of a person in a vehicle 202 may communicate, via a cellular backhaul of the network 201, with a deductible determination server 205 to transmit information regarding a current driving condition and receive an adjusted deductible. While FIG. 2 illustrates that the mobile computing devices 100*m* may connect to the network 201 while within vehicles 202, it should be understood that these same mobile computing devices 100*m* may connect to the network 201 even if they are removed from the vehicles 202. For example, a mobile computing device 100*m* being used by a user that is not driving may connect to the network 201. In an aspect of the present application, a user that is not driving (e.g., a passenger or person not in a vehicle) may use the mobile computing device 100*m* to review past deductibles provided in past trips that the user has been on.

FIG. 2 illustrates two vehicles 202. However, the deductible determination system may be configured to communicate with computing devices in more vehicles 202 (in particular, in a large volume of vehicles 202) simultaneously so that it may provide adjusted deductibles for multiple drivers simultaneously. Also, although FIG. 2 depicts the vehicles 202 as cars, the vehicles 202 may be any type of vehicle, including a motorcycle, bicycle, scooter, drone (or other automated device), truck, bus, boat, plane, helicopter, etc. Further, although FIG. 2 depicts the vehicles 202 being in close proximity to each other, it should be understood that the vehicles 202 may be in separate locations (e.g., such that they cannot communicate directly with each other).

FIG. 2 also illustrates an example subsystem within the network environment 200. Specifically, FIG. 2 illustrates an example arrangement of computing devices that may exist within one or more of the vehicles 202. As shown in FIG. 2, a vehicle 202 may include a mobile computing device 100*m*, a vehicle computing device 100*v*, and an on board diagnostic (OBD) device 206 having a connector for connecting to an on board diagnostic connector (e.g., an OBD II port). The mobile computing device 100*m* may be carried into the vehicle 202 by a person. In some cases, more than one mobile computing device 100*m* may be in a vehicle 202. For example, both a driver and passenger may have their own mobile computing devices 100*m* that they carry with them into the same vehicle 202. The mobile computing device 100*m* may be any mobile computing device (e.g., a smartphone, tablet, etc.) that is associated with a driver or passenger of the vehicle 302.

The mobile computing device 100*m* may be configured in a similar manner to the computing device 100 of FIG. 1, and therefore, may include a deductible controller 101. The mobile computing device 100*m* may be configured to execute a deductible determination program that adjusts a deductible and/or provides a user interface for a user to provide inputs to and receive outputs from the deductible determination system. Such a client-side deductible determination program may be downloaded or otherwise installed onto the mobile computing device 100m using known methods. Once installed onto the mobile computing device 100m, a user may launch the client-side deductible determination program by, for example, operating buttons or a touchscreen on the mobile computing device 100m. Additionally, or alternatively, the mobile computing device 100m may be configured to execute a web browser (e.g., an application for accessing and navigating the Internet) to access a web page providing an interface for the deductible determination system. In some embodiments, the mobile computing device 100m may also be configured to collect drive data using, e.g., its accelerometer, GPS, gyroscope, etc. Drive data may include vehicle telematics data or any other data related to events occurring during a vehicle's trip (e.g., an impact to a part of the vehicle, a deployed airbag, etc.). Drive data may also include location information, such as GPS coordinates, indicating the geographical location of the mobile computing device 100m.

In some embodiments, the mobile computing device 100m may communicate (e.g., via Bluetooth) with a vehicle computing device 100v. As mentioned above and as shown in FIG. 2, a vehicle 202 may include a vehicle computing device 100v. The vehicle computing device 100v may be configured in a similar manner to the computing device 100 of FIG. 1, and therefore, may include a deductible controller 101. Further, the vehicle computing device 100v may be configured to execute the client-side deductible determination program that facilitates collection of data used to determine the current driving situation with respect to the vehicle. Such a client-side deductible determination program may be downloaded or otherwise installed onto the vehicle computing device 100v using known methods. Once installed onto the vehicle computing device 100v, a user may launch the client-side deductible determination program by, for example, operating buttons or a touchscreen on the dashboard of the corresponding vehicle 202. In some examples, the client-side deductible determination program may be automatically launched whenever the vehicle 202 is started or put in gear. Additionally, or alternatively, the vehicle computing device 100v may be configured to execute a web browser to access a web page providing an interface for the deductible determination system. In some embodiments, the vehicle computing device 100v may be configured to collect drive data using, e.g., its accelerometer, GPS, gyroscope, etc. As mentioned above, this drive data may include vehicle telematics data or any other data related to events occurring during a vehicle's trip (e.g., an impact to a part of the vehicle, a deployed airbag, or other event triggered by a sensor of the vehicle). The vehicle 202 may have a GPS installed therein, and therefore, the vehicle computing device 100v may also collect GPS coordinates.

Moreover, in some embodiments, the vehicle computing device 100v may be configured to collect drive data from other nearby vehicles 202. For example, as shown in FIG. 2, a vehicle computing device 100v of one vehicle 202 may directly communicate with a vehicle computing device 100v of another vehicle 202. Standards for implementing such vehicle-to-vehicle communication are expected to be developed. Any such standards may be used by one vehicle computing device 100v to collect drive data from another vehicle computing device 100v. Further, any information collected by a vehicle computing device 100v may be shared with a mobile computing device 100m within the same vehicle via, e.g., a Bluetooth or other local connection.

Further, the vehicle computing device 100v may be a system including multiple devices. For example, the vehicle computing device 100v may include a microphone and/or speakers for notifying (or alerting) the user about a deductible adjustment. Additionally, the vehicle computing device 100v may include or be configured to interface with one or more vehicle sensors (e.g., fuel gauge, tire pressure sensors, engine temperature sensors, speedometers, odometers, etc.). Thus, the vehicle computing device 100v may be configured to determine a current driving condition based on various factors. For example, the vehicle computing device 100v may determine that the current driving situation is dangerous (or less safe than desired) because tire pressure in one or more tires is low. Such a determination may cause the deductible to be increased. The deductible may be increased to an adjusted deductible and remain at the adjusted deductible until the tire pressure is improved or may steadily increase over time (or as miles accumulate) until the tire pressure is improved. In either case, it may be expected that the increase will incentivize or encourage the user to correct the tire pressure, and thus, improve the safety of the vehicle, which in turn may improve the current driving situation.

In some embodiments, one or more of the vehicles 202 may be autonomous or in an autonomous mode (e.g., auto-pilot mode). An autonomously controlled vehicle 202 may be controlled by its vehicle computing device 100v and/or a remote computing device. The vehicle computing device 100v may employ sensors for inputting information related to a vehicle's surroundings (e.g., distance from nearby objects) and use the inputted information to control components of the vehicle s 202 to steer the vehicle 202.

The vehicle computing device 100v may also interface with the mobile computing device 100m via a wired connection (e.g., USB) or via the OBD device 206. The OBD device 206 may be connected to the OBD II connector/port of the vehicle 202, which is typically located beneath the steering wheel of the vehicle 202. The OBD device 206 may facilitate sharing of drive data collected by the vehicle computing device 100v with the mobile computing device 100m. In some embodiments, the OBD device 206 may be used to collect drive data itself. For example, the OBD device 206 may include a GPS receiver, accelerometer, gyroscope, etc. in order to collect GPS coordinates, acceleration data, deceleration data, turning data, etc. Also, the OBD device 206 may include a microphone to collect audio data from within the vehicle 202 to determine a noise level within the vehicle. In some embodiments, the OBD device 206 may communicate with the deductible determination servers 205, without the use of a mobile computing device 100m, to provide drive data to the deductible determination servers 205. As such, in some instances, a mobile computing device 100m or vehicle computing device 100v might not be required to perform deductible adjustments on-the-fly.

Still referring to FIG. 2, the mobile computing devices 100m may communicate with other devices of the deductible determination system (e.g., third party servers 203, service provider servers 204, and/or deductible determination servers 205) via the network 201. As shown in FIG. 2, the mobile computing devices 100m may connect to the network 201 via a cell tower 207 or access point 208. For example, a mobile computing device 100m may transmit and receive cellular signals via a cell tower 207 so that the mobile computing device 100m may communicate with the deductible determination system while traveling in a moving vehicle 202. Text messages may be sent to/from the mobile computing devices 100m via the cell towers 207 of a cellular backhaul at various times, and in particular when the mobile computing devices 100m are traveling within vehicles 202. In addition, mobile computing devices 100m may send/ receive other information via the cell towers 207. For example, a mobile computing device 100m may receive traffic information (which may be used to determine deductible adjustments as described herein) from a third party server 203 via a cell tower 207 providing cellular coverage to an area in which the mobile computing device 100m is located. In some cases, information may be relayed via multiple cell towers 207 to reach a mobile computing device 100m.

Additionally, or alternatively, a mobile computing device 100m or vehicle computing device 100v may transmit and receive other wireless signals (e.g., WiFi signals) to/from access points 208 set up along roads, highways, etc. so that the mobile computing device 100m and/or vehicle computing device 100v may communicate with the deductible determination system while the vehicle 202 is moving. For example, a mobile computing device 100m may receive weather information (which may be used to determine deductible adjustments) from a third party server 203 via an access point 208 as the vehicle 202 carrying the mobile computing device 100m passes the access point 208. Moreover, a vehicle computing device 100m may transmit drive data, indicating that it is speeding (and thereby indicating that the driving behavior is not safe), via a nearby access point 208 alongside the road, to the deductible determination system (which may use such information for determining an adjustment to the deductible). Although only one access point 208 is shown in FIG. 2, additional access points may be used. In some cases, information may be relayed via multiple access points 208.

FIG. 2 also illustrates third party servers 203. Herein, a server may refer to any network computing device specially configured to communicate over a network and/or any other type of computing device. The third party servers 203 may be owned or controlled by various entities that have been tasked with or employed for collecting or entering data that may be used as a factor in determining a level of safety of a current driving situation. For example, a third party server 203 may be a server of a company that collects or generates weather information or a server of a government office/ agency that provides accident reports. The third party servers 203 may be configured in a similar manner as the computing device 100 of FIG. 1. In some embodiments, the third party servers 203 may be particularly configured to handle (e.g., receive and respond to) a large volume of requests for information. The third party servers 203 may store or be connected to databases that store various types of information that may be used to evaluate a driving situation. For example, third party servers 203 may provide weather information for determining weather conditions, traffic information for determining traffic conditions, road information (including road maps) for determining road conditions, construction information for determining construction zones, etc. Further, the third party servers 203 may communicate with other third party or fourth party devices that include sensors for measuring and collecting data that could be used to evaluate a current driving situation. For example, a third party server 203 may receive its weather information from data collected by a thermometer, barometer, etc. Also, a third party server 203 may receive traffic information from images captured with a camera. Although FIG. 2 depicts the third party servers 203 as being collocated, it should be understood that the third party servers 203 may be at separate locations. For example, one third party server 203 at a first location may provide weather information, while another third party server 203 at a second location (separate from the first location) may provide traffic information.

The third party servers 203 may receive location information (e.g., GPS coordinates) corresponding to a location of a mobile computing device 100m, determine relevant information for that location, and return the relevant information to the requesting mobile computing device 100m (or another appropriate device in the system such as one of the deductible determination servers 205) via the network 201. The third party servers 203 may execute a server-side deductible determination program for handling requests so that requests are properly parsed and responses are properly packaged for delivery to mobile computing devices 100m, service provider computing devices 204, and/or deductible determination servers 205.

FIG. 2 also illustrates service provider servers 204. The service provider servers 204 may be configured in a similar manner as the computing device 100 of FIG. 1. In some embodiments, the service provider servers 204 may include or be a part of a subsystem including components of a cellular network (e.g., Global System for Mobile Communications (GSM) network), such as base stations or a mobile switching center (MSC). In some embodiments, the service provider servers 204 may be configured to connect one or more cellular backhaul systems (including cell towers 207) with other components of the deductible determination system (e.g., third party servers 203 and deductible determination servers 205). For example, a mobile computing device 100m may want insurance related information while it is in a moving vehicle 202, and therefore, may send a cellular signal to a nearby cell tower 207 requesting such information. The cell tower 207 may relay the cellular signal to a service provider computing device 204, which may decode/demodulate the cellular signal and produce a different signal (e.g., IPv4/IPv6 packet) that may be received by the deductible determination servers 205. The service provider computing device 204 may also receive signals from deductible determination servers 205 or third party servers 203 and generate cellular signals that may be used to transfer information to mobile computing devices via cell towers 207. For example, a service provider computing device 204 may inform a deductible determination server 205 that text messages and/or phone calls are blocked from being sent to a user, so that the deductible determination server 205 may use such information to determine an adjustment (e.g., a decrease) of the deductible.

The service provider computing devices 204 may be maintained, controlled, and/or owned by cellular network providers (e.g., AT&T, VERIZON, etc.). Different service provider computing devices 204 may be used for different cellular network providers.

FIG. 2 also depicts deductible determination servers 205. The deductible determination servers 205 may belong to an insurance company that provides insurance (e.g., automotive insurance), or to another company that manages and maintains the deductible determination servers 205 on behalf of (or for providing a service to) an insurance company. The deductible determination servers 205 may be configured in a similar manner as the computing device 100 of FIG. 1, and therefore, may include a deductible controller 101. The deductible determination servers 205 may be specially configured (e.g., programmed) to communicate with a plurality of mobile computing devices 100m vehicle computing devices 100v, and/or OBD devices 206. In particular, the deductible determination servers 205 may be configured to receive data from mobile computing devices 100m indicating that a user is driving, what vehicle the user is driving, a condition of the vehicle itself, a condition inside or outside of the vehicle, and where a user is driving. Based on the information received from the mobile computing device 100m and other information (e.g., information received from third party servers 203 or information stored in databases within or connected to the deductible determination servers 205), the deductible determination servers 205 may determine whether to adjust a deductible and if so, by the amount of the adjustment. The deductible determination servers 205 may also report the adjustments to the mobile computing device 100m.

In some embodiments, the deductible determination servers 205 may receive and store drive data on a driver-by-driver basis. For example, the deductible determination servers 205 may store drive data received from a first mobile computing device 100m in association with a driver associated with the first mobile computing device 100m, and store other drive data received from a second mobile computing device 100m in association with another driver associated with the second mobile computing device 100m. In this manner, the deductible determination servers 205 may have access to a driving behavior history of different drivers. The deductible determination servers 205 may include storage for storing this information or may be connected to local or remote databases used to store such information.

The deductible determination servers 205 may also store (or access databases that store) other insurance related information, such as information that may be associated with an insurance policy (e.g., automotive insurance policy, home insurance policy, etc.). For example, the deductible determination servers 205 may store or access insurance premiums, insurance deductibles, an insurance claim history, or accident reports as well as user information of an insurance policy, such as phone numbers of drivers on an insurance policy.

In some embodiments, the deductible determination servers 205 may also track participation in the deductible determination system and maintain a log of deductible adjustments on a per person or per policy basis. For example, the deductible determination servers 205 may store in memory (e.g., internal memory of the deductible determination servers 205 or memory of another database in communication therewith) a log or record of all deductible adjustments so that users can review their past deductible adjustments and see how their driving behavior impacts their deductible. In some examples, the log may include a reason for the adjustment. For example, if the deductible was decreased because the driver drove in good weather conditions, the log may indicate that good weather conditions were the reason for the deductible and may also, in some instances, indicate the precise weather conditions (e.g., sunny, good visibility, etc.).

Figure 3:
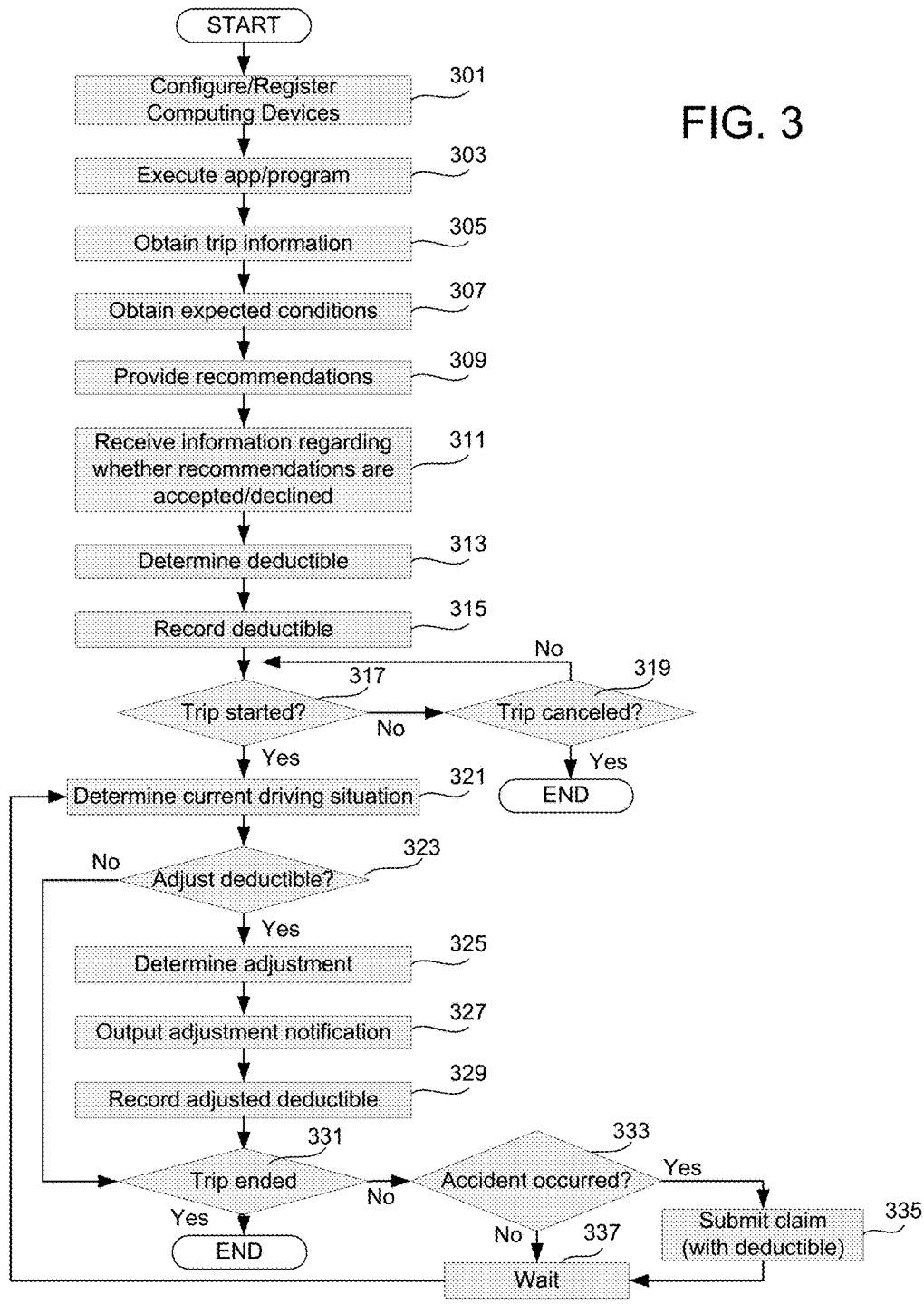
FIG. 3 illustrates a flow diagram of an example process in accordance with aspects of the present disclosure.

FIG. 3 illustrates a flow diagram for an example method in accordance with aspects of the present disclosure. More specifically, FIG. 3 illustrates a plurality of steps of a method for adjusting deductibles on-the-fly (e.g., in real time) based on a current driving situation (e.g., real time driving conditions). The steps of FIG. 3 may be performed by various devices disclosed herein, and in particular a mobile computing device 100m, such as a cell phone of a driver of the vehicle 202, a vehicle computing device 100v, or a deductible determination server 205. Herein, where the system is described as performing a step or process, it should be understood that any device in the system may perform the step or process alone or in conjunction with another device of the system (or another device connected thereto). One or more of the steps of FIG. 3 may be performed by executing a client-side deductible determination program, a server-side deductible determination program, and/or operating a particularly configured computing device of the deductible determination system. As a result of the method of FIG. 3, an adjusted deductible may be determined and output to a user on-the-fly so that when mobile computing device 100m users are driving they might be incentivized or encouraged to improve the driving situation in which they are driving. Consequently, performance of the method of FIG. 3 may lead to a reduction in traffic accidents, which may lead to a reduction in costs of insurance companies, which in turn may translate into lower rates for customers of insurance companies. Additionally, performance of the method of FIG. 3 may lead to lower deductibles, which may increase customer satisfaction, which in turn may lead to customer loyalty and customer retention.

The method of FIG. 3 may begin with a step 301 of configuring and/or registering the computing devices (e.g., mobile computing device 100m, vehicle computing device 100v) of the deductible determination system. For example, configuring a mobile computing device 100m of a customer of an insurance company may include downloading and installing a deductible determination program (e.g., a client-side deductible determination program). Different mobile computing devices 100m and vehicle computing devices 100v may install different versions of the deductible determination program depending on a platform of the mobile computing device 100m or vehicle computing device 100v. For example, a mobile computing device running the iOS™ operating system may download a different version of the deductible determination program than a device running the ANDROID™ operating system.

Step 301 may also include registering a computing device (e.g., mobile computing device 100m or vehicle computing device 100v) with the organization (e.g., an insurance company) providing the deductible determination system. Registering a computing device may include creating and/or logging into an account with an associated username and/or password. The account may be associated with the mobile computing device 100m and/or an insurance policy of a user of the mobile computing device 100m. To perform registration, the organization providing the insurance company may request various information, including information regarding a user device (e.g., device identifier, device make, device model, etc.), information regarding a user (e.g., name, birthdate, address, insurance policy number, etc.), and/or information regarding a vehicle (e.g., make, model, year, vehicle identification number (VIN), etc.). Registration may also include setting up an account for maintaining a record of deductible adjustments.

In some embodiments, when registering with the deductible determination system, a user may create a profile. The profile may include certain user preferences so that a customized experience may be realized.

In step 303, the client-side deductible determination program installed on the mobile computing device 100m may be executed. Where the client-side deductible determination program is an "app" on a smartphone, step 303 may include a user selecting the "app" and the operating system of the smartphone running the "app." The client-side deductible determination program may run continuously in the background of the mobile computing device 100m so that it is configured to adjust deductibles whenever a user is driving. In other words, the deductible determination program may run in the background of the mobile computing device 100m continuously so that users do not have to interact with the program each time they are about to begin a drive or end a drive. Because the client-side deductible determination program may run in the background it might not be distracting to users wishing to perform other operations with their mobile computing devices 100m, and therefore, users may be more likely to adopt the client-side deductible determination program. In some embodiments, once launched, the client-side deductible determination program may be launched automatically each time the mobile computing device 100m is powered on. Thus, if the mobile computing device 100m is turned off or its battery dies, the client-side deductible determination program may be automatically launched again when the mobile computing device 100m is turned back on or powered back up.

In some embodiments, the client-side deductible determination program may enter a sleep mode so as not to drain the battery of the mobile computing device 100m when the user is not driving. For example, in some embodiments, the client-side deductible determination may remain in a sleep mode to conserve battery power until a user begins driving.

In step 305, a mobile computing device 100m (e.g., using the client-side deductible determination program), a vehicle computing device 100v, a deductible determination server 205 (by way of a mobile computing device 100m or vehicle computing device 100v), or other device of the deductible determination system may obtain trip information. Step 305 may include obtaining route information indicating a route to be taken for an upcoming trip or trip currently underway. Step 305 may also include obtaining destination information indicating a destination for an upcoming trip or trip currently underway. Other trip information, such as a number of passengers, names of passengers, vehicle information indicating a make, model, year, etc. of a vehicle to be driven on a trip, and driver information indicating a name of a driver, may also be obtained at step 305.

Step 307 may include obtaining expected conditions for the trip. For example, weather conditions or road conditions that may be encountered on the trip may be obtained. These conditions may be obtained from information provided by third party servers 203. Such conditions may be based on the route information or destination information obtained in step 305. For example, using the destination of the trip, weather conditions that may be encountered along the way to the destination may be obtained. Also, for example, using route information indicating the route of the trip, information regarding road conditions of roads forming the route may be obtained.

In some embodiments, step 307 may include obtaining information regarding the vehicle 202 to be used for the trip. This information may be obtained from, for example, the vehicle computing device 100v (including, e.g., vehicle sensors). Examples of this information may include that tire pressure of the vehicle 202 is low, brake fluid of the vehicle 202 is low, brakes of the vehicle 202 are old or worn out (which may be determined based on number of miles driven and when the brakes were last replaced), windshield wipers of the vehicle 202 are old or worn out (which may be determined based on an amount of total time or number of times they have been used), or that the vehicle 202 otherwise needs maintenance.

In step 309, the deductible determination system may determine and provide recommendations to the driver of the trip. For example, the system may recommend that another driver (e.g., the wife of the intended driver, another colleague of the intended driver, etc.) be the driver for the trip. Also, the system may recommend that a different route be taken for the trip. For example, the system may determine that another route is safer and may recommend that the user take the other route for the trip. Other recommendations may include postponing the trip until the weather changes (e.g., until it stops raining) or making the trip at a different time (e.g., either earlier or later) so that the trip takes place at a time when there is less traffic (e.g., non-rush hour times) or better visibility (e.g., during the day instead of at night).

In some embodiments, an amount of an adjustment of a deductible or the new adjusted deductible that would be received if the recommendation is accepted may be provided in step 309 as well. For example, the mobile computing device 100m may display a message on its screen recommending that the user take a safer route different from the one intended and indicating that if the user takes the safer route their deductible may be decreased by $100. When providing recommendations in step 309, the system may also prompt the user whether they wish to accept or decline the recommendations.

Step 311 may include receiving information regarding whether a user accepted or declined one or more recommendations. It should be understood that a user may accept one recommendation and decline another recommendation. Accepting or declining a recommendation may be performed by a user by pressing a button or key on the mobile computing device 101m or vehicle computing device 100v (which may include, e.g., a display mounted on the dashboard of a vehicle 202).

In step 313, based on the expected conditions and information regarding whether recommendations were accepted or declined, the deductible determination system may determine a deductible for the trip. Acceptance of recommendations may result in lower deductibles. Moreover, in some examples, acceptance of a recommendation may result in a lower deductible than if the user had planned to take the recommended course of action in the first place. For example, the user's deductible may be lower in a case where the user selects a first route but then accepts a recommendation to take a second route (e.g., a safer route) than if the user were to have selected the second route from the start. Thus, the user may be especially rewarded for accepting recommendations. In some embodiments, the deductible may be output to the user (e.g., driver of the trip) at step 313 as well.

In step 315, the adjusted deductible may be recorded in memory (such as memory of a mobile computing device 100m, vehicle computing device 100v, deductible determination server 205, or any other device of the deductible determination system or any other memory of any computing device in communication with the system). The newly adjusted deductible or an amount of adjustment from a base deductible (e.g., the base deductible set in an insurance policy) may be recorded. A time may also be stored in association with the adjusted deductible. The time may represent a time at which the adjusted deductible becomes effective. If the vehicle is involved in an accident, the deductible in effect at the time of the accident may be the deductible used to determine what the policy holder is responsible for and what the insurance company is responsible for. The adjusted deductible may remain in effect until a new adjusted deductible is determined or for a predetermined time after it becomes effective (in the latter case, the deductible may revert back to the base deductible or some other deductible upon expiration of the predetermined time).

In some embodiments, the time recorded in step 315 may correspond to the time that the adjusted deductible was determined or a predefined time thereafter (e.g., 1 minute after the determination is made). In some embodiments, where the adjusted deductible is determined by a deductible determination server 205, the time may correspond to the time that the adjusted deductible was transmitted to the mobile computing device 100m or vehicle computing device 100v. In some embodiments, the time may correspond to the time that the adjusted deductible was output to the user. For example, the time may be a time that the mobile computing device 100m or vehicle computing device 100v displayed the adjusted deductible or played an audio message indicating the adjusted deductible.

In step 317, the system may determine whether a trip has started. This determination may be made based on an input from a user indicating the start of a trip. Additionally, or alternatively, this determination may be made based on automatically acquired information, such as information indicating whether a vehicle 202 is running or information indicating that the vehicle is moving (which may be assumed based on the mobile computing device 100m traveling above a certain speed).

If the deductible determination system determines that the trip has not started (No at step 317), the system may determine whether the trip has been canceled at step 319. In step 319, the system detects whether the trip has been canceled based on manual information and/or automatic information. For example, the user may indicate that the trip is canceled by pressing a button or key on a mobile computing device 100m or vehicle computing device 100v. The system may also assume the trip is canceled if the vehicle 202 is not turned on or moved within a certain period of time from, for example, execution of the client-side deductible determination program at step 303 or determination of the deductible at step 313.

If the trip is canceled (Yes at step 319), the process may end. Of course, the process may be repeated again in the future when the user goes to take another trip. It should be understood that the process of FIG. 3 may be performed multiple times as a user may make multiple driving trips.

If it is determined that the trip is not canceled (No at step 319), the system may repeat step 317. Effectively, the system may wait until it determines whether the trip is started or canceled.

Once it is determined that the trip has started (Yes at step 317), the deductible determination system may determine a current driving situation at step 321. Herein, a current driving situation may be a situation that the vehicle is in during a particular trip. The deductible determination system may select one or more of various factors for determining the current driving situation. Example factors include weather conditions (e.g., whether it is sunny, cloudy, rainy, etc.) at the vehicle's current location (or in proximity, e.g., within a mile, five miles, etc., of the vehicle), road conditions (e.g., slippery, road work in progress, etc.) the vehicle may encounter, traffic conditions (e.g., heavy, medium, light, etc.) at the vehicle's current location, type of roads (e.g., highways, one way street, street with medium, residential street, etc.) the vehicle is travelling on, conditions inside a vehicle 202 (e.g., noisy, distractions, etc.), conditions outside of the vehicle 202 but in the vehicle's proximity (e.g., towing a boat or trailer, tailgating, etc.), conditions of the vehicle 202 itself (e.g., needs maintenance), conditions of the driver (e.g., whether the driver sleepy, intoxicated, etc.) which may be captured using a camera or other sensor (e.g., breathalyzer), choices a driver makes (e.g., whether to allow text messages or phone calls), driving behavior (e.g., hard braking events, speeding, hard acceleration, hard turning, etc.), number of passengers in the vehicle 202, accident history at the current location (e.g., the driver's accident history, general public's accident history, or accident history of an entity's customers such as the accident history of an insurance company's customers), insurance company claims associated with the current location (e.g., number of insurance claims made for accidents occurring at the current location, damage claimed in insurance claims at the current location), traffic lane (e.g., left lane, middle lane, right lane, etc.), and time of day (e.g., 8 am or between 3 pm and 5 pm).

In some embodiments, factors not specific to the current driving situation may also be selected for consideration in determining the deductible. For example, the driver's age, gender, eyesight, etc. may be selected. In some embodiments, the factors selected may vary. The factors selected may depend on the driver or insurance policy. Certain factors may be considered for one driver, but not another. The factors selected may also depend on how long a driver has been a customer of an insurance company (e.g., how long an insurance policy has been active). Also, the factors selected may depend on what information is available at a time of making the determination. Moreover, factors selected may depend on other factors. For example, if weather conditions are good and/or it is during the daytime, the system might not consider the type of roads.

Once the factors to consider have been selected, the deductible determination system may obtain information associated with the selected factors. For example, if the system selects to consider traffic information, the system may poll a third party server 203 to obtain traffic information. Specifically, the system may send the third party server 203 a current location (e.g., GPS coordinates) of the vehicle 202 and receive traffic information (e.g., whether the traffic in the current location is light, medium, heavy, very heavy, etc.) in return.

The information for the selected factors may come from various sources depending on what information is being sought. Sources may include any of the computing devices in the deductible determination system, including one or more third party servers 203, one or more service provider servers 204, one or more deductible determination servers 205, the mobile computing device 100m, the vehicle computing device 100v, the OBD device 206, etc. For example, information on whether the user has chosen to block text messages or phone calls may come from the mobile computing device 100m or service provider server 204. Information on whether the vehicle 202 is currently speeding may come from the vehicle computing device 100v or OBD device 206. Information on a number of insurance claims or total amount of damage claimed associated with the current location of the vehicle 202 may be retrieved from one or more deductible determination servers 205 or one or more databases (e.g., computing devices of an insurance company) connected thereto.

In some embodiments, the deductible determination system may convert (or translate) the obtained information for each selected factor into a standard format or score (e.g., value). In some cases, the deductible determination system may determine a value for each piece of obtained information. For example, the system may convert information that the current traffic is light into a score of "1" and convert information that the current traffic is heavy into a score of "5." Also, the system may, for example, set a certain variable (e.g., a Boolean variable) that is designated for factoring in whether it is raining to have a certain value (e.g., a value of "true") if the obtained weather information indicates that it is indeed raining where the driver is driving. Converting or translating the obtained information may assist the system in considering a plurality of different types of information in a single determination of the current driving situation. The obtained information in its raw form might not be suitable for use in determining the current driving situation, and thus, it may be necessary to first convert the raw information.

The obtained information or converted information may be used in an algorithm for determining (or computing) a safety score (or level of safety). In some embodiments, different algorithms may be available and the system may choose which algorithm to use. The algorithm may be selected based on the type of driver or the insurance policy of the driver.

Further, step 321 may include selecting weights used by the algorithm to weigh the obtained information or converted information appropriately. A weight may be a coefficient for a variable designated for a particular type of condition. Different conditions may be weighted differently. For example, weather conditions may be weighted more heavily than traffic conditions, which may be weighted more heavily than a noise level inside the vehicle 202.

Using any determined weights and the obtained information (in either its raw or converted form), an algorithm for determining the safety score for the current driving situation may be executed. Execution of the algorithm may result in a numeric value that may represent a safety score for the current driving situation. In some cases, this safety score may be on a scale of 1 to 100, 1 to 5, or any other scale.

In step 323, the deductible determination system may determine whether to adjust the deductible. This determination may be based on the safety score determined in step 321. For example, the deductible determination system may determine to adjust the deductible if the safety score is above a threshold, below a threshold, or has changed by a certain amount from a previously calculated safety score for the same trip. For example, if the safety score exceeds an 80 out of 100, the system may determine to adjust the deductible, whereas a safety score of 75 might not trigger the system to adjust the deductible. Additionally, or alternatively, if the safety score has changed (e.g., increased or decreased) by a predefined threshold (e.g., 5 points) from a safety score previously determined during the same trip, the system may determine to adjust the deductible. The thresholds described herein may differ for different trips or different drivers. By including this step of determining whether to adjust a deductible, the process may regulate how often deductibles are adjusted. In some cases, it might not be desirable to frequently adjust the deductible because frequent adjustments may, for example, distract the driver.

If the system determines not to adjust the deductible (No at step 323), the system may proceed to step 331 to determine whether the trip has ended as described in further detail below. It should be understood that the system may repeat steps 321 and 323 multiple times during a single trip.

If the system determines to adjust the deductible (Yes at step 323), the system may determine the adjustment at step 325. Determining the adjustment to the deductible may include determining a new deductible or determining an amount by which to change a policy holder's current deductible (which may be the standard deductible or a recently adjusted deductible). Step 325 may include obtaining the standard deductible set forth in an insurance policy or the most recently adjusted deductible. The adjustment to the deductible for the current trip may be determined using the safety score. The deductible adjustment for the current trip may also be determined using information regarding past accidents or past insurance claims for (a) the current route or road being taken for the current trip, (b) the type of driver or driving history/record of the current driver, and/or (c) the current driving situation (which may be represented by the safety score).

The information regarding past accidents (e.g., vehicle collisions involving multiple vehicles, vehicle crashes, and other moving vehicle accidents) may indicate a type of accident (e.g., vehicle collision, vehicle crash, etc.), the driver(s) involved in the accident, the party responsible for the accident, the vehicle(s) involved in the accident, condition(s) at the time of the accident, and a location of the accident. This information may be stored in association with each other for each accident and this information may exist for a plurality of accidents so that a significant amount of information is available for adjusting deductibles.

The information regarding past insurance claims (e.g., automotive insurance claims) may indicate a policy holder who submitted the claim, an amount of damage claimed, a reason or event (e.g., accident, theft, vandalism, natural disaster, etc.) that led to the insurance claim being issued, a location of the event that led to the insurance claim being issued, a date and/or time of the event that led to the insurance claim being issued, a weather condition (or any other condition) during the event that led to the insurance claim being issued, a party/entity responsible for the event that resulted in the damage, the driver if the claim relates to a moving vehicle accident, etc. This information may be stored in association with each other for each claim and this information may exist for a plurality of claims so that a significant amount of information is available for adjusting deductibles.

The information regarding past accidents or past insurance claims may be obtained from the deductible determination servers 205 and/or one or more databases (or other devices) connected thereto. Also, information regarding past accidents may be extracted from information regarding past insurance claims. As discussed, insurance claim information may indicate a reason or event (e.g., accident, theft, vandalism, natural disaster, etc.) that led to the insurance claim being issued. Thus, accident information may be collected (or extracted) from such insurance information.

The following are some examples of adjustment determinations that may be made by the deductible determination system using, e.g., a deductible controller 101 (which may use, e.g., a deductible determination program). In the following examples, various values are given for ease of explanation and to aid in understanding the possible relationships (e.g., linear, logarithmic, exponential, etc.) between the information used to determine the adjustment and the end result of the determination. It should be understood that other values and relationships may be used in practice.

An example of an adjustment determination at step 325 for a current trip may include using information that only three (3) accidents occurred along the route that is being taken for the current trip to determine that the deductible should be decreased from $1,000 to $900. In comparison, if the same information were to indicate that seven (7) accidents occurred along the route that is being taken for the current trip, the system may determine to adjust the deductible to $950 instead. In contrast, if the same information were to indicate that a large number of accidents (e.g., 50 accidents within the last year) have occurred along the route, the system may determine to increase the deductible from $1,000 to $1,020.

As another example, an adjustment determination at step 325 for a current trip may include using information that the current driver has previously been in an accident on the same route that is being taken for the current trip to determine that the deductible should be increased from $500 to $525. In comparison, if the same information were to indicate that the driver has previously been in two accidents on the same route that is being taken for the current trip, the system may determine to adjust the deductible from $500 to $600. In contrast, if the same information were to indicate that the current driver has never been in an accident on the same route that is being taken for the current trip, the system may determine to decrease the deductible from $500 to $450.

As yet another example, an adjustment determination for a current trip may include using information that drivers similar to the current driver (e.g., similar in age, gender, interests, geographical location, etc.) have previously been in twenty (20) accidents on the same route that is being taken for the current trip to determine that the deductible should be increased from $750 to $800. In comparison, if the same information were to indicate that other similar drivers (e.g., drivers of similar type) have previously been in one hundred (100) accidents on the same route that is being taken for the current trip, the system may determine to adjust the deductible from $750 to $1,000. In contrast, if the same information were to indicate that the other similar drivers have only been in three (3) accidents (or never been in an accident) on the same route that is being taken for the current trip, the system may determine to decrease the deductible from $750 to $500.

Further, an adjustment determination for a current trip may include using information that accidents are 15% more likely in cases where the safety score matches the current safety score to determine that the deductible should be increased from $500 to $530. In comparison, if the same information were to indicate that accidents are 20% less likely to occur in cases where the safety score matches the current safety score, the system may decrease the deductible from $500 to $460.

In some cases, a baseline safety score may be predetermined and deductibles may be adjusted up or down depending on whether the actual safety score for the current driving situation is greater than or less than the baseline safety score, respectively. For example, where a baseline safety score is set to 80 (out of 100), the system may increase the deductible by $50 if an actual safety score of 73 is determined for the current driving situation or decrease the deductible by $50 if an actual safety score of 87 is determined for the current driving situation.

Still referring to step 325, the adjustment determination for a current trip may include using insurance information that only one (1) claim resulted from an accident that occurred along the route that is being taken for the current trip to determine that the deductible should be decreased from $500 to $400. In comparison, if the same insurance information were to indicate that five (5) claims resulted from accidents that occurred along the route that is being taken for the current trip, the system may determine to adjust the deductible to $450 instead. In contrast, if the same insurance information were to indicate that a large number of claims (e.g., 30 claims within the last three years) have resulted from accidents that occurred along the route, the system may determine to increase the deductible from $500 to $510.

As another example, an adjustment determination at step 325 for a current trip may include using insurance information indicating that the current driver has previously submitted a claim as a result of an accident on the same route that is being taken for the current trip to determine that the deductible should be increased from $500 to $525. In comparison, if the same insurance information were to indicate that the driver has previously submitted two claims as a result of being in two accidents on the same route that is being taken for the current trip, the system may determine to adjust the deductible from $500 to $600. In contrast, if the same insurance information were to indicate that the current driver has never submitted a claim for an accident on the same route that is being taken for the current trip, the system may determine to decrease the deductible from $500 to $450.

As yet another example, an adjustment determination for a current trip may include using insurance information indicating that drivers similar to the current driver (e.g., similar in age, gender, interests, geographical location, etc.) have previously submitted twenty (20) claims as a result of accidents on the same route that is being taken for the current trip to determine that the deductible should be increased from $750 to $800. In comparison, if the same insurance information were to indicate that other similar drivers (e.g., drivers of similar type) have previously submitted one hundred (100) claims as a result of accidents on the same route that is being taken for the current trip, the system may determine to adjust the deductible from $750 to $1,000. In contrast, if the same insurance information were to indicate that the other similar drivers have only submitted three (3) claims for accidents occurring on the same route that is being taken for the current trip, the system may determine to decrease the deductible from $750 to $500.

After determining the adjustment to the deductible at step 325, an adjustment notification may be output to the user (e.g., driver, policy holder, owner, etc.) of the vehicle. In some cases, the adjustment notification may notify the user of the full adjusted deductible (e.g., $500) may be output to the user, and in some cases, the adjustment notification may notify the user of the amount of the adjustment (e.g., −$100 or +$100). The adjustment notification may be a message displayed on a display of a mobile computing device 100*m* of the driver, another passenger in the vehicle 202, and/or another policy holder. In some examples, the adjustment notification may be a message displayed on a display of a vehicle computing device 100*v* of the vehicle 202 being driven. Also, in some examples, the adjustment notification may be an audible message or sound played by a mobile computing device 100*m* or vehicle computing device 100*v* so that the driver may be alerted to the adjustment without having to take his/her eyes off the road. Further, in some embodiments where, e.g., the adjustment determination is performed by a deductible determination server 205, step 327 may involve the deductible determination server 205 transmitting the adjusted deductible to a mobile computing device 100*m* or vehicle computing device 100*v* so that the adjusted deductible may be output to the driver. Because the adjustments may be output to drivers while they are driving, the adjustment may incentivize or encourage drivers to drive more safely, avoid driving on a dangerous route, change their driving situation (e.g., reduce a noise level in the vehicle, block text messages from being received on their mobile computing devices 100*m*, etc.), avoid dangerous driving conditions (e.g., stop driving in bad weather or heavy traffic).

In step 329, the adjusted deductible that was determined in step 325 may be recorded. For example, the adjusted deductible may be stored in memory of a deductible determination server 205 or a device connected thereto. In such examples, step 329 may involve a mobile computing device 100*m* transmitting the adjusted deductible to a deductible determination server 205 so that the adjusted deductible may be recorded. The adjusted deductible may also be stored in memory of a mobile computing device 100*m* or vehicle computing device 100*v*. The adjusted deductible may be stored in association with a time. The time may represent a time at which the adjusted deductible becomes effective. Recording of the adjusted deductible in step 329 may be similar to the recording of the deductible in step 315, and thus, further description of step 329 is not given here.

In step 331, the system determines whether the trip has ended. A user (e.g., driver or passenger) may indicate the end of a trip by selecting an option (e.g., button or key) on a mobile computing device 100*m* or vehicle computing device 100*v*. In some examples, the end of the trip may be recognized (automatically) by the system based on an analysis of, for example, location information or speed information. If the location of the vehicle 202 has not changed or the speed of the vehicle 202 has remained below a predetermined threshold for some predetermined amount of time, the system may determine that the trip has ended. The system may also determine that the trip has ended if the driver does not respond to a prompt, output from the mobile computing device 100*m* or vehicle computing device 100*v*, to the user regarding whether the trip has ended. Such a prompt may include an audible message or displayed message to the user (e.g., driver or passenger).

If it is determined that the trip has ended (Yes at step 331), the process may end. If it is determined that the trip has not ended (No at step 331), step 333 may be performed. In step 333, the system may determine whether an accident has occurred during the trip. In some embodiments, the system may automatically determine that an accident has occurred. For example, vehicle sensors (e.g., airbag sensors) may detect the accident and send a signal to the mobile computing device 100*m* of the driver informing the system that an accident has occurred. In some examples, the user (e.g., driver) may select an option (e.g., button or key) on a mobile computing device 100*m* or vehicle computing device 100*v* to indicate that an accident has occurred.

If the user is involved in an accident during the trip, the user may submit an insurance claim at step 335. In some examples, submission of the claim may simply involve a user indicating that an accident has occurred. In some examples, the claim may be automatically submitted upon automatic detection of the accident. When submitting a claim, some information about the claim may be automatically captured by the system and include in the claim submission. For example, the mobile computing device 100*m* through which the claim is submitted may automatically retrieve GPS coordinates for inclusion with the claim submission. Accordingly, the device receiving the claim submission (which may be a deductible determination server 205 or other device of the same entity, such as an insurance company, that manages the deductible determination servers 205) may record a location in association with the claim. Moreover, in some examples, the user (e.g., driver or passenger) may enter other information, such as a description of another vehicle or the damage sustained, as part of the claim submission.

The claim submitted in step 335 may also include data indicating the deductible at the time of the accident. For example, the mobile computing device 100*m* may determine the most recently determined deductible adjustment and include that adjustment with the claim submission. In this manner, the claim may include the deductible that was in effect at the time of the accident.

In step 337, the system may execute a wait period. The wait period may be executed so that the deductible determination is not repeated excessively. For example, it might not be desirable to repeat the deductible determination every millisecond because such determinations may be computationally expensive (e.g., CPU intensive), and therefore, may take up processing power of a device that could otherwise be used to perform other processes and/or may drain a battery of a device. Such considerations may be of particular concern in embodiments where the deductible determination is performed by a mobile computing device 100*m*. Accordingly, the deductible determination system may implement a wait period of, for example, one minute. After the wait period, the system may repeat step 321 to determine the current driving situation again, and then subsequently may determine another deductible adjustment. As such, the current driving situation may be evaluated multiple times during a trip and the deductible may be adjusted multiple times during the trip in accordance with changes in the current driving situation.

It should be understood that the method of FIG. 3 is an example and that other methods with similar steps are contemplated. In such other methods, additional steps may be included or steps may be omitted. Also, other methods may change the order of any of the steps. For example, step 325 may be performed before step 323 such that the system determines what the adjusted deductible would be before determining whether to effectuate the adjustment.

Figure 4:
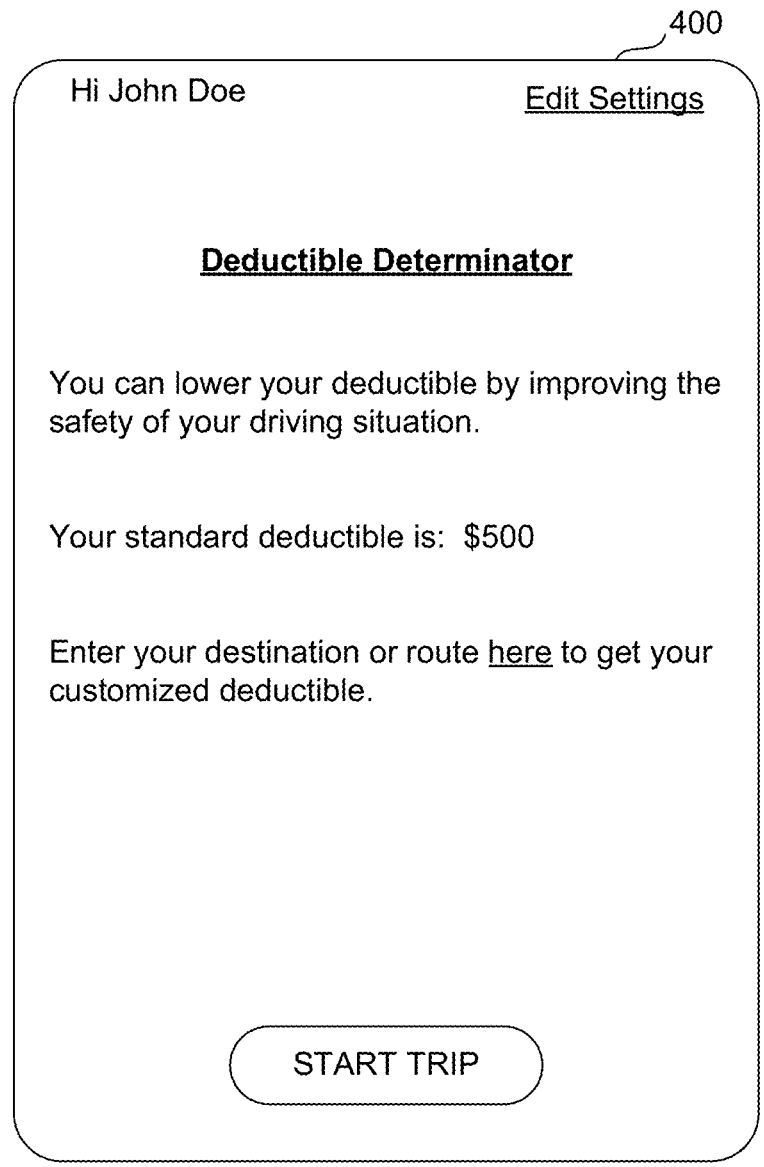
FIGS. 4-6 illustrate example interfaces that may be presented by computing devices configured according to aspects of the present disclosure.
Figure 5:
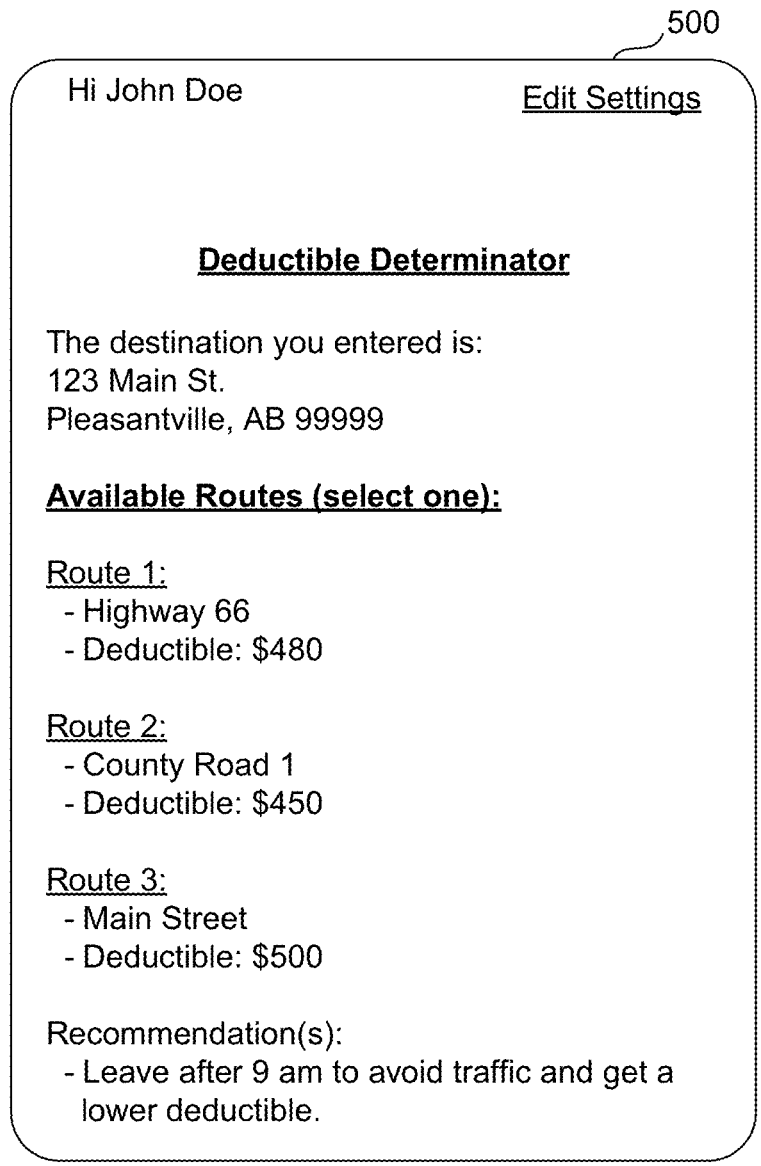
Figure 6:
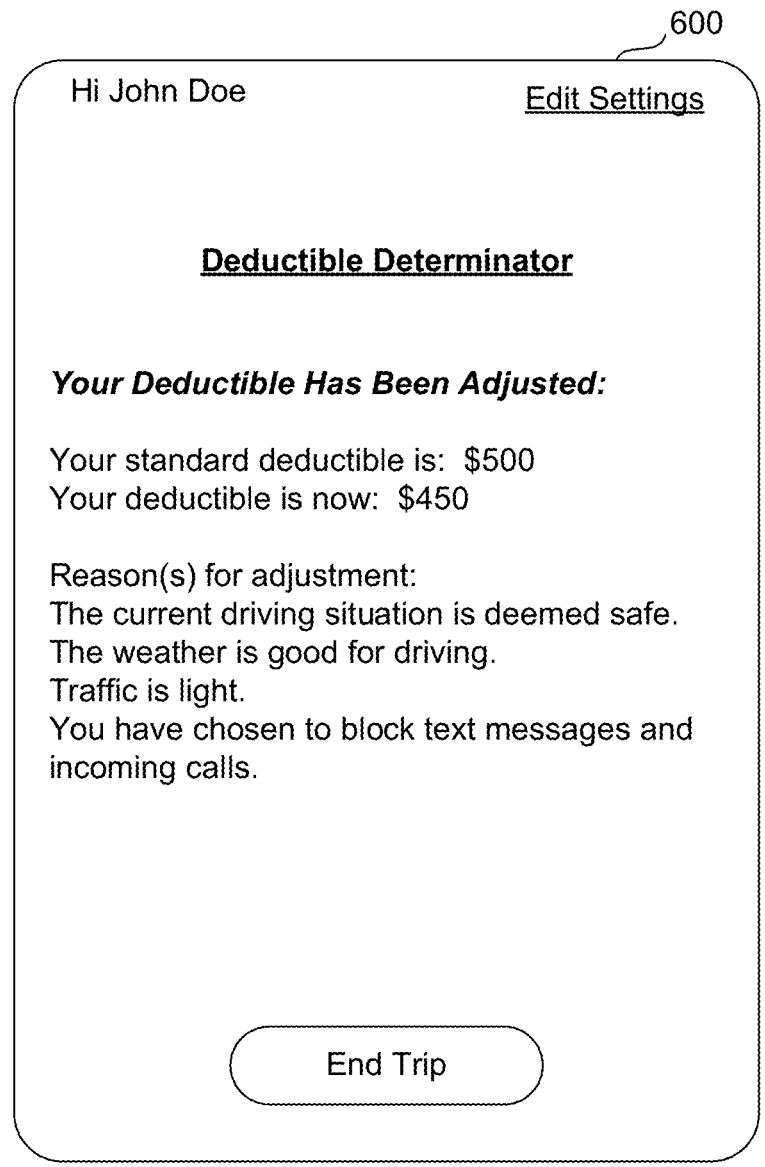

FIGS. 4-6 illustrate example user interfaces in accordance with aspects of the present disclosure. These interfaces may be displayed on a screen of a mobile computing device 100*m* (e.g., a smartphone) or vehicle computing device 100*v* before, during, or after a trip. These interfaces may be generated by a client-side deductible determination program. Data for generating these interfaces may be provided as a push notification from a server (e.g., deductible determination server 205 or service provider server 204) or as a message (e.g., short message system (SMS) message or multimedia message system (MMS) message). It should be understood that the interfaces 400-600 of FIGS. 4-6 are intended to illustrate various features and aspects of the deductible determination system, and that interfaces are not limited to the visual appearance or layouts depicted in FIGS. 4-6.

The interface 400 may be displayed before a user has begun driving. As shown in FIG. 4, the interface 400 may include a message to the user informing the user that she may lower her deductible by improving the safety of her driving situation. In some examples, a link to a tutorial or other interface may be included to further explain what factors may contribute to the safety of the driving situation and what the user may do to improve the safety of the driving situation. Further, the interface 400 may display the user's standard deductible (e.g., $500) as set forth in the applicable insurance policy. In an aspect of the present disclosure, when a policy holder and insurance company establish an insurance policy, the parties may agree on certain terms which may set the standard deductible and specify that the deductible may increase or decrease depending on a driving situation.

The mobile computing device 100*m* displaying the user interface 400 may retrieve the standard deductible from the deductible determination server 205 or another device of an insurance company providing the applicable insurance policy. For example, the mobile computing device 100*m* may transmit identification information (identifying the user/driver, vehicle, insurance policy, mobile phone number, etc.) to a deductible determination server 205 which may respond with the appropriate standard deductible based on the identification information.

FIG. 4 also shows that the interface 400 may include an option (e.g., button or key) for the user to press (or otherwise select) to indicate that a trip is to begin/start. Additionally, or alternatively, voice commands may be used to indicate that the trip is to begin. In some embodiments, the interface 400 may also include a link that allows the user to enter her destination or intended route prior to beginning a trip.

When the link in FIG. 4 for entering a destination or route is selected, another interface may be displayed on the screen of the mobile computing device 100m or vehicle computing device 100v. FIG. 5 illustrates an example interface 500 displayed in response to selection of such a link. As show in FIG. 5, the user may enter a destination for a trip that is about to begin and the system may determine one or more routes (if available multiple routes may be determined). The one or more available routes may be output (e.g., displayed) to the user to allow the user to select which route she wishes to take. For each route, the system may determine and provide a deductible that would apply. Such deductibles may be based on the level of safety of the particular route. The deductibles may be lower or higher than the standard deductible.

As shown in FIG. 5, the deductible for route 2 may be lower than the deductible for route 1 because route 2 may be deemed safer based on past insurance claim information, past accident information, and/or safety scores calculated for the routes. Also, for example, the deductible for route 2 may be lower than the deductible for route 1 because the traffic, at the time the trip is to be taken, on route 2 may be less than the traffic on route 1.

FIG. 5 further illustrates that the system may provide recommendations. In the example interface 500 of FIG. 5, the recommendation may include a message that a lower deductible may be applied if the trip is delayed until a time when traffic is reduced. Other recommendations may be provided as well. For example, the interface 500 may include a recommendation/suggestion to wait until bad weather ends or visibility improves.

FIG. 6 illustrates an example interface 600 that may be displayed during a trip (e.g., while a vehicle is moving). As shown in FIG. 6, the interface 600 may include a message or alert indicating that the deductible has been adjusted. It should be understood that such a message or alert may be provided to the user as an audio message or other sound, thereby informing the user of the adjustment without requiring the user to view a display. The audio message or other sound may be played through the vehicle's speakers or a speaker of the mobile computing device 100m.

In some examples, the user or driver may be informed of the standard deductible and the new (e.g., current) deductible in effect. In some examples, the user or driver may just be informed that the deductible has been adjusted and/or that the adjustment is up or down. Still, in some examples, the user or driver may be informed of the amount of the deductible adjustment.

Further, in some embodiments, the interface 600 may include one or more reasons that the deductible was adjusted. For example, the interface 600 may include a message indicating that the adjustment was decreased because the current driving situation was deemed safe. Also, the interface 600 may provide more specific reasons for the adjustment. For example, the interface 600 may indicate that the adjustment was applied because of the weather (e.g., because it is sunny), traffic (e.g., because it is light), and/or a driver's choice to block text messages and phone calls from being received or transmitted.

FIG. 6 also illustrates that the interface 600 may include an option (e.g., button or key) for the user to press (or otherwise select) to indicate that a trip has ended. Additionally, or alternatively, the user may provide voice commands to indicate that the trip has ended. The user/driver may indicate that the trip has ended so that the deductible determination system stops evaluation the current driving situation and stops adjusting the deductible until a future trip.

Further, the interfaces 400-600 also illustrate that an option to change settings may be provided. For example, the user/driver may change settings related to whether they are notified of deductible adjustments and how often they are notified of deductible adjustments. The settings may also be used to turn on/off an ability to receive or send text messages or phone calls. In some embodiments, the settings may be used to modify terms or information of an insurance policy, including changing the standard deductible.

Aspects of the invention have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the invention. For example, step 301 might not be performed each time the process is performed.

What is claimed is:

1. A system, comprising:
an end user computing device associated with a vehicle and comprising a wireless network interface configured to communicate over a wireless network; and
a network computing device, comprising a network interface configured to exchange communications with the end user computing device, wherein at least one of the end user computing device and the network computing device stores a plurality of algorithms, each of the algorithms configured to process data from a set of one or more sensors, the network computing device configured to:
obtain, from the end user computing device or another network computing device, driving situation information indicating a driving situation related to the vehicle while the vehicle is moving, the driving situation information including the data from the set of one or more sensors;
select one of the plurality of algorithms based on at least one characteristic of a driver of the vehicle and based on at least a portion of the driving situation information;
determine a degree of safety of the driving situation based on at least the portion of the driving situation information and using the selected one of the plurality of algorithms, wherein determining the degree of safety using the selected one of the plurality of algorithms includes identifying one or more weights to be applied to one or more variables in the selected one of the plurality of algorithms;
obtain a deductible of an insurance policy for the vehicle; and
adjust the deductible based on the degree of safety of the driving situation.

2. The system of claim 1, wherein the end user computing device comprises a mobile computing device of a driver of the vehicle or a vehicle computing device installed in the vehicle.

3. The system of claim 1, wherein the network computing device comprises a server of an insurance company associated with the insurance policy.

4. The system of claim 1, wherein the driving situation information comprises at least one of:
- weather information regarding weather at a location of the vehicle;
- traffic information regarding traffic at the location of the vehicle;
- road information regarding a condition or level of safety of a road on which the vehicle travels;
- vehicle status information regarding a condition of the vehicle;
- vehicle condition information regarding a condition inside or in proximity to the vehicle;
- driving behavior information regarding a speed, acceleration, or deceleration of the vehicle;
- driver status information regarding a condition of a driver of the vehicle; or
- driver choice information regarding whether the driver of the vehicle chose to block a text message or phone call.

5. The system of claim 1, wherein the determining the degree of safety of the driving situation comprises determining a safety score.

6. The system of claim 1, wherein network computing device is further configured to:
- prior to obtaining the driving situation information, select one or more factors to be considered; and
- obtain the driving situation information based on the one or more factors selected.

7. The system of claim 1, wherein the network computing device is further configured to determine the one or more weights.

8. The system of claim 1, wherein the adjusting the deductible based on the degree of safety of the driving situation comprises using data regarding past accidents or past insurance claims.

9. The system of claim 8, wherein the adjusting the deductible using the data regarding past accidents or past insurance claims comprises decreasing the deductible when a number of past accidents on a route along which the vehicle is moving is below a first threshold or increasing the deductible when the number of past accidents on the route is above a second threshold.

10. The system of claim 1, wherein the adjusting the deductible based on the degree of safety of the driving situation comprises decreasing the deductible in response to an increase in the degree of safety of the driving situation or increasing the deductible in response to a decrease in the degree of safety of the driving situation.

11. The system of claim 1, wherein the network computing device is further configured to determine whether to adjust the deductible prior to adjusting the deductible.

12. A computing device, comprising:
- a network interface configured to communicate with a server or an end user computing device while the end user computing device is traveling within a vehicle, wherein at least one of the computing device, the server or the end user computing device stores a plurality of algorithms, each of the algorithms configured to process data from a set of one or more sensors; and
- at least one processor configured to cause the computing device to:
  - obtain, from the end user computing device or the server, driving situation information indicating a driving situation related to the vehicle while the vehicle is on a trip, the driving situation information including the data from the set of one or more sensors;
  - select one of the plurality of algorithms based on at least one characteristic of a driver of the vehicle and based on at least a portion of the driving situation information;
  - determine a degree of safety of the driving situation based on at least the portion of the driving situation information and using the selected one of the plurality of algorithms, wherein determining the degree of safety using the selected one of the plurality of algorithms includes identifying one or more weights to be applied to one or more variables in the selected one of the plurality of algorithms;
  - obtain a deductible of an insurance policy for the vehicle; and
  - determine an amount by which to adjust the deductible based on the degree of safety of the driving situation.

13. The computing device of claim 12, wherein the at least one processor is configured to further cause the computing device to store an adjusted deductible resulting from adjusting the deductible by the amount determined based on the degree of safety of the driving situation in memory.

14. The computing device of claim 12, wherein the at least one processor is configured to further cause the computing device to store, in memory, the amount by which the deductible is adjusted and a time at which the amount is determined.

15. The computing device of claim 12, wherein the at least one processor is configured to further cause the computing device to transmit, to the end user computing device, a notification indicating the amount by which the deductible is adjusted.

16. A method, comprising:
- receiving, by a computing device from a sensor in proximity to a vehicle, driving situation information indicating a driving situation related to the vehicle while the vehicle is traveling along a route, the driving situation information including data detected by the sensor;
- selecting one of a plurality of algorithms based on at least one characteristic of a driver of the vehicle and based on at least a portion of the driving situation information, each of the algorithms configured to process data from a set of one or more sensors;
- determining a degree of safety of the driving situation based at least on the driving situation information and using the selected one of the plurality of algorithms, wherein determining the degree of safety using the selected one of the plurality of algorithms includes identifying one or more weights to be applied to one or more variables in the selected one of the plurality of algorithms;
- obtaining a deductible of an insurance policy for the vehicle; determining an adjustment to the deductible based on the degree of safety of the driving situation; and
- outputting, via a display of the computing device or a speaker of the computing device, a notification to a driver of the vehicle, the notification indicating the adjustment to the deductible.

17. The method of claim 16, wherein the determining the adjustment to the deductible based on the degree of safety of the driving situation comprises determining the degree of safety of driving on the route based on past accident information or past insurance claim information.

18. The method of claim 16, further comprising transmitting, by the computing device to an insurance company's server, the adjustment to the deductible and a time at which the adjustment to the deductible was determined.

* * * * *